United States Patent [19]

Martinez

[11] Patent Number: 4,585,072
[45] Date of Patent: Apr. 29, 1986

[54] GARDENING TOOL WITH PLUG EJECTOR AND DETACHABLE CUTTING CHAMBER

[76] Inventor: Alfred J. Martinez, 11602 Chesterton St., Norwalk, Calif. 90650

[21] Appl. No.: 570,604
[22] Filed: Jan. 13, 1984
[51] Int. Cl.⁴ .............. A01B 45/00; A01B 45/02; A01C 11/00; A01D 9/06
[52] U.S. Cl. ............................ 172/22; 111/4; 294/50; 294/50.7
[58] Field of Search .......... 172/22, 21, 25; 171/53; 111/4, 99; 294/50, 50.7; 175/20, 244

[56] References Cited

U.S. PATENT DOCUMENTS

| | | | |
|---|---|---|---|
| 806,838 | 12/1905 | Raymond | 111/99 X |
| 1,692,436 | 11/1928 | Deane | 172/22 X |
| 1,783,026 | 11/1930 | Ober | 111/4 X |
| 1,939,897 | 12/1933 | Hill | 172/22 X |
| 2,531,297 | 11/1950 | Rose | 172/22 X |
| 2,768,570 | 10/1956 | Strid | 172/22 X |
| 3,123,391 | 3/1964 | Novak | 172/22 X |
| 3,210,112 | 10/1965 | Glynn | 172/22 X |
| 3,273,930 | 9/1966 | Gottfried | 294/50.5 |
| 3,444,938 | 5/1969 | Ballmann | 175/173 |
| 3,927,720 | 12/1975 | Rauch | 172/22 |

FOREIGN PATENT DOCUMENTS

| | | | |
|---|---|---|---|
| 1249663 | 11/1960 | France | 111/4 |
| 510933 | 1/1955 | Italy | 172/22 |

Primary Examiner—Robert A. Hafer
Assistant Examiner—Terrence L. B. Brown
Attorney, Agent, or Firm—Charles H. Thomas

[57] ABSTRACT

An improved tool for removing weeds and for planting plugs of grass is provided with an elongated, upright sleeve having a hollow chamber at the lower extremity thereof. A plunger is operated to pass through the chamber by means of an elongated handle extending upwardly through the sleeve. The plunger is positioned over weeds or other undesirable vegetation and the walls of the chamber are pushed into the soil to surround the root system of the weeds and to define a plug of soil. The tool is then lifted from the soil, carrying with it the weed with the plug of soil containing the root system of the weed intact. The handle is operated to push the plunger through the hollow chamber to eject the plug of soil and the weeds carried therewith.

7 Claims, 7 Drawing Figures

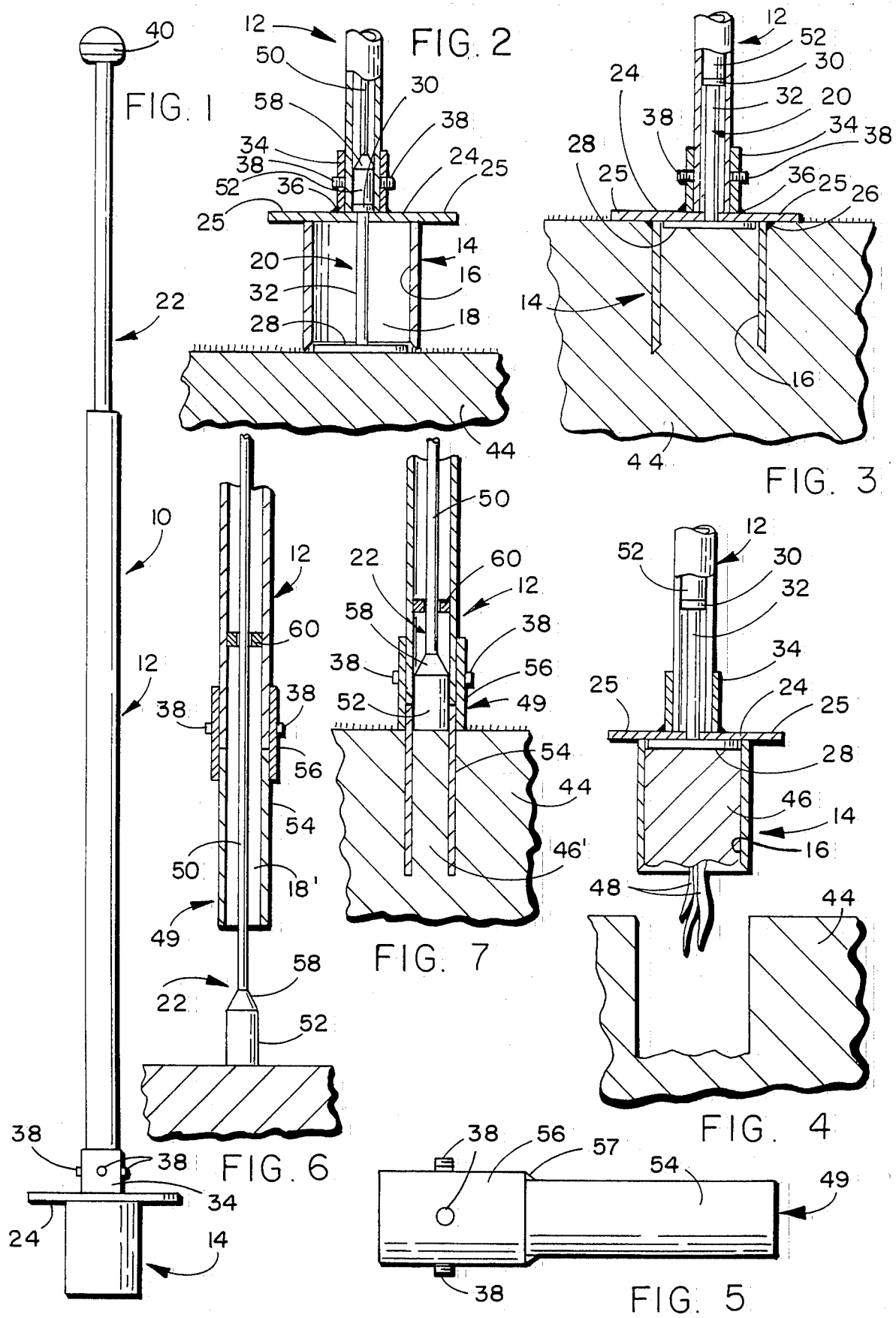

GARDENING TOOL WITH PLUG EJECTOR AND DETACHABLE CUTTING CHAMBER

BACKGROUND OF THE INVENTION

1. Field of the Invention

The present invention relates to gardening tools for removing weeds and other undesirable vegetation in a lawn or garden, and to tools for planting plugs of desirable grass.

2. Description of the Prior Art

The eradication of weeds from lawns and gardens has been a major preoccupation of gardeners, caretakers and landscapers, as well as farmers, residential homeowners and horticulturists over the many years. Various methods of weed eradication are utilized, but all methods have significant disadvantages and require a great deal of manual labor. Weeds such as dandelions, chickweed and other common garden weeds have presented a constant blight to lawns and gardens for centuries, as have noxious grasses such as crab grass and rye grass. To beautify lawns and to permit the growth of desired vegetation, such as short bladed grass and vegetables, it has been necessary to eradicate weeds either through chemical treatment or by physical removal.

There are certain disadvantages to the eradication of weeds through chemical treatment. Herbicides are available which will selectively attack broad leafed weeds, such as dandelions, but which will not harm the growth of desirable grasses, such as Kentucky bluegrass and creeping bent. Chemical herbicides are rather expensive, however, and the application of such herbicides entails certain disadvantages. While it is possible to selectively eradicate broad leafed weeds with herbicides, crab grass and other noxious grasses cannot be selectively removed from desirable lawn grasses. Furthermore, lawn and garden herbicides can be toxic or irritating to children and animals. Children will frequently roll and frolic on chemically treated lawns and as a result develop rashes and other skin irritations if the lawn has been treated with a herbicide. Also, house pets can become ill when exposed to lawns which have been treated with herbicides. Furthermore, the individuals who apply the herbicides to lawns are exposed to the toxic effects of the chemicals contained therein, and often suffer skin and eye irritations as well as nausea and other discomfort as a result of exposure to lawn herbicides. In addition, herbicides cannot be used in vegetable gardens, as they are toxic to growing vegetables.

Another method of weed eradication is through physical removal of the weeds. Various tools have been devised for this purpose, but all such tools can be used to eradicate weeds only with considerable effort. Furthermore, weed removal with the tools heretofore available has been laboriously slow and the results are far from satisfactory. While tools are available which are able to remove the surface growth of weeds, the root systems of the weeds frequently remain intact. After removal of the surface growth of the weeds the roots promptly sprout new surface growth. As a consequence, physical removal of weeds with conventional tools involves hard physical labor which produces only very temporary eradication of weeds and noxious grasses.

Most conventional gardening tools for weed removal employ a cutting blade which acts horizontally or at an inclined angle relative to the generally vertical orientation of the weed structure. For example, weeding with a garden hoe is accomplished by attacking the weeds with chopping strokes of the hoe blade. The upper portion of the undesirable growth is removed, but the root structure remains to support immediate regrowth.

Another conventional weed removal tool which is widely used employs a V-shaped cutting blade on the end of an elongated handle. The cutting blade is positioned so as to embrace the tap root or primary root structure of the weed and to remove the upper portion of the offensive plant through a combined cutting and prying action. Again, however, major portions of the root structure remain in the soil and promptly flourish into a new weed growth. Also, a tool of this type is useful only for removing weeds one by one, and is incapable of removal of several adjacent weeds at one time.

SUMMARY OF THE INVENTION

The present invention is a gardening tool which operates on a different principle than gardening tools heretofore utilized for weed removal. Instead of laterally cutting or prying at the plant structure of weeds or noxious grasses, the tool of the invention employs a hollow chamber defined by upright walls. The tool is positioned directly above a weed, or a patch of weeds or undesired growth. The lower portion of the tool defining the hollow chamber therewithin is pressed into the soil to delineate a plug which encompasses the entire root structure of the weed or group of weeds. The tool is then lifted vertically. The plug of soil bearing the upper portion of the root structure of the weed is carried by the hollow chamber as the tool is lifted upwardly. Moreover, even if the root structure of the weeds extends deeper into the soil than the walls of the hollow chamber, the root structure will not break off as the plug of soil is lifted. Because the tool is vertically lifted, there is no shearing action to laterally sever the weed roots. Rather, the portion of the weed roots which extends below the plug of soil that is withdrawn by the tool is lifted vertically from the soil therebeneath. As a consequence, the entire root structure of a weed or a group of weeds can be removed from the surrounding soil utilizing the tool according to the invention. The weed roots are far less likely to break off and serve as a source for further weed growth when removed with the tool of the present invention, as contrasted with removal techniques using conventional weed removal tools.

In a preferred embodiment the tool of the invention is provided with alternative, interchangeable end attachments. One such attachment may be configured to receive relatively large plugs of soil in which several weeds grow in close proximity to each other. An end attachment for this purpose is constructed with a turf receiving chamber having upright walls and a roof with an aperture therethrough. The turf receiving chamber is open at the bottom. A plunger is disposed for longitudinal reciprocal movement relative to the turf receiving chamber. The plunger covers the expanse enclosed within the upright walls of the chamber. An upright, elongated sleeve is secured to the chamber roof about the aperture in the roof, and extends upwardly therefrom. A handle is reciprocally mounted within the sleeve to bear against the plunger to eject the plug of turf in the turf receiving chamber once the plug has been lifted from the surrounding soil.

The turf receiving chamber roof is preferably constructed in the form of a flat, oblong plate that has a pair of opposing flanges that overhang the cylindrical walls of the turf receiving chamber. An individual is able to step on these flanges, thereby forcing the walls of the turf receiving chamber into the soil. The resistance of the soil within the confines of the walls forces the plunger upwardly against the roof.

To remove the encapsulated plug, the tool is drawn vertically upward. The plug of turf is carried vertically upwardly within the turf receiving chamber. Any portion of the weed root structure extending below the plug removed is drawn out of the soil beneath and is not severed. Once the plug has been removed, it can be ejected by pressing on the handle residing within the sleeve. The lower end of the handle terminates in a broadened foot which bears against the plunger to eject the plug of turf from the turf receiving chamber.

An alternative end attachment may be employed with the tool of the invention to remove much smaller plugs of soil. The tool is comprised of an elongated upright tubular sleeve and a handle which is longitudinally reciprocal within the sleeve. The handle is preferably formed with a knob at the upper end of a thin, rod-like shank. The lower extremity of the shank is broadened to define a foot which may serve as the plunger itself. An end attachment having the same inner dimensions as the sleeve may be secured to the lower end of the sleeve to define a narrow, turf or plug receiving chamber. The plunger is used to locate the plug of soil to be removed and is positioned atop the growth of a weed and pressed lightly downwardly. The sleeve around the outside of the plunger is then raised and thrust downwardly into the soil. The lower extremity of the sleeve thereupon defines a hollow plug receiving chamber. As the tool is lifted from the soil, the lower extremity of the sleeve extension carries the plug circumscribed therewithin upwardly, thereby extracting the weed located therewithin. Because the tool is withdrawn vertically upwardly, there is no shearing action on the roots of the weed, and the entire root system of the weed is withdrawn with the plug in the lower end of the sleeve. Once the plug bearing the weed has been withdrawn, it may be ejected by pressing on the handle relative to the sleeve to push the weed and the soil plug out of the end of the sleeve.

The invention may be described with greater clarity and particularity by reference to the accompanying drawings.

DESCRIPTION OF THE DRAWINGS

FIG. 1 is an elevational view of an embodiment of the tool of the invention utilizing one end attachment.

FIG. 2 is a cross-sectional elevational view of the lower portion of the embodiment of the tool of FIG. 1 prior to depression of the tool into the soil.

FIG. 3 is a sectional elevational view of the portion of the tool of FIG. 2 once it has been pressed into the soil.

FIG. 4 is a sectional elevational view of the portion of the tool of FIG. 2 showing removal of the plug of soil.

FIG. 5 illustrates an alternative end attachment for the tool of the invention.

FIG. 6 is a sectional elevational view illustrating use of the tool of the invention with the end attachment of FIG. 5.

FIG. 7 illustrates the lower extremity of the embodiment of the tool of FIG. 6 as it is pressed into the soil.

DESCRIPTION OF THE INVENTION

FIG. 1 illustrates a gardening tool 10 which is constructed of steel and which employs an elongated, upright cylindrical annular sleeve or pipe 12. The tool 10 has a hollow chamber 18 defined by the wall 16 of the end attachment 14 at the lower extremity of the sleeve 12. The chamber 18 has cylindrical annular walls 16, as depicted in FIG. 2, which define a cavity having a uniform circular cross-sectional area perpendicular to the alignment of the sleeve 12. A plunger 20 is disposed within the chamber 18 to occupy the expanse of the uniform cross-sectional area of the cavity. The plunger 20 moves longitudinally within the cavity 18. The handle 22 includes an elongated steel rod 50 a little over four feet in length. The rod 50 terminates in a broadened foot 52 which bears upon the plunger 20 so as to push the plunger 20 through the chamber 18.

The hollow chamber 18 is formed of a relatively short section of annular steel tubing, preferably about four and a half inches in length and three and a quarter inches in inner diameter. The cylindrical wall 16 of the tubing section is approximately one-eighth of an inch thick. The lower edge of the wall 16 is tapered to facilitate depression into the soil.

The section of tubing defining the wall 16 is attached to the underside of an oblong steel plate 24. Ends of the plate 24 overhang the wall 16 to define a pair of diametrically opposed flanges 25. The steel tubing defining the wall 16 is secured to the plate 24 by means of an annular weld bead on the underside of the plate 24, indicated at 26 in FIG. 3.

The plunger 20 employs a flat, disc-shaped circular steel piston 28 which is disposed within the hollow chamber 18. The piston 28 extends across the hollow chamber 18 and is perpendicular to the alignment of the tubular sleeve 12. The piston 28 occupies virtually the entire expanse of the uniform cylindrical cross-section defined within the wall 16, leaving just enough clearance at its perimeter to slide freely longitudinally within the cavity 18 without significant frictional interaction with the wall 16. The downward longitudinal movement of the piston 28 is limited by the flat, circular cap 30 at the top of an upright steel rod 32 forming a plunger stem. The plunger stem 32 extends through a central, axial aperture in the flat plate 24. The circular cap 30 is larger than the aperture in the disc 24.

The plunger 20 can be moved longitudinally away from the sleeve 12 to one extreme position indicated in FIG. 2. The plunger 20 can be moved longitudinally upwardly to an opposite extreme position in which the top of the piston 28 resides in abutment with the underside of the disc-shaped plate 24, as depicted in FIG. 3.

A short annular socket 34 is permanently secured to the top of the chamber roof formed by the disc-shaped plate 24 by an annular weld, indicated at 36. The socket 34 is disposed coaxially about the aperture in the oblong shaped plate 24.

The cylindrical annular pipe forming the sleeve 12 fits snugly within the confines of the socket 34. The sleeve 12 and the socket 34 are releasably secured together by means of four set screws 38 spaced 90 degrees apart. The set screws 38 are threadably engaged in tapped radial bores in the socket 34. The set screws 38 can be tightened to firmly grip the outer surface of the sleeve 12 in firm, frictional engagement.

The handle 22 includes an elongated steel rod 50 which is a structure separate from the plunger 20 when the end attachment 14 is used. The rod 50 is threaded at its upper extremity and a plastic knob 40 is threadably engaged therewith. The handle 22 is longitudinally reciprocal within the sleeve 12. The handle 22 may be used to press the plunger from its extreme upward position of FIGS. 3 and 4 to its extreme extended position, depicted in FIG. 2.

As is evident from FIGS. 1–4, the annular steel tubing or pipe forming the sleeve 12 is of a considerably narrower diameter than the tubing forming the turf receiving chamber 18. Preferably, the inner diameter of the sleeve 12 is approximately one inch.

To use the gardening tool 10, the lawn or garden is first thoroughly watered so as to increase the cohesiveness of the soil depicted at 44 in FIGS. 2, 3 and 4. The tool is then positioned vertically upright with the piston 28 of the plunger 20 resting directly atop and centered upon a weed or group of weeds. The operator then steps upon the flanges 25 which overhang the wall 16. The flanges 25 are formed by the edges of the flat plate 24 which extend beyond the wall 16 of the turf receiving chamber 18. By exerting one's weight upon the plate 24, the section of steel tubing forming the turf receiving chamber 18 is pressed into the soil 44 as depicted in FIG. 3.

The plate 24 can be pressed downwardly until the flanges 25 come to rest upon the surface of the soil 44. As the steel tubing of the hollow chamber 18 is forced into the ground, the plunger 20 is forced upwardly from the position of FIG. 2 to the position of FIG. 3 by the resistance of the soil within the confines of the annular wall 16.

When the hollow chamber 18 has been compressed into the soil as depicted in FIG. 3, the cavity defined therewithin is completely occupied by a cylindrical plug of soil. This cylindrical plug of soil contains the major portion of the root structure of the weed or group of weeds atop which the plunger 20 resides.

The tool 10 is then lifted vertically upwardly, as depicted in FIG. 4. The plug 46 of soil is carried out of the surrounding soil 44 by the turf receiving chamber 18. The roots of the weed are not severed as the plug 46 is lifted. Quite to the contrary, the lower extremities 48 of the weed roots which extend below the plug 46 are lifted unbroken from the soil 44 therebeneath since there is no shearing force exerted on them, contrary to the operation of prior weed extraction tools. With the entire structure of the weed removed with the soil plug 46, weed regrowth is retarded to a far greater extent than is possible with conventional gardening tools. The plug 46 carrying the weed or weeds, is positioned over a disposal receptacle such as a trash can or trash disposal bag. The handle 22 is thereupon forced downwardly into the sleeve 12. The broadened foot 52 of the handle 22 thereupon bears against the cap 30 of the plunger 20. The continued downward force on the handle 22 causes the piston 28 to move from the position of FIG. 4 to the position depicted in FIG. 2. This results in ejection of the plug 46. Once the plug 46 has been ejected, the tool 10 is again ready for reuse.

FIGS. 5, 6 and 7 illustrate the tool 10 of the invention equipped with an alternative end attachment 49 in place of the end attachment 14 depicted in FIGS. 1 through 4. The end attachment 49 employs a short length of steel tubing 54, approximately five inches long. The steel tubing 54 is of the same cross-sectional dimensions as the sleeve 12. That is, the tubing 54 is of the same diameter as the sleeve 12 and has the same inner and outer dimensions. An annular collar 56 is fitted coaxially over the upper end of the tube section 54 and is secured thereto by welds 57. The collar 56 is equipped with four radial, tapped bores adapted to receive set screws 38.

As is evident from FIG. 6 and FIG. 7, the end attachment 49 defines a hollow turf receiving chamber 18'. When the end attachment 49 is employed, the broadened foot of the handle 22 does not strike a separate plunger structure, but rather serves as the plunger itself.

Either the end attachment 14 or the end attachment 49 can be secured by set screws 38 to the lower extremity of the sleeve 12. Preferably, an annular plastic washer 60 is secured in the lower end of the sleeve 12. The washer 60 has a central aperture which guides the rod 50 of the handle 22, particularly when the broadened foot 52 of the handle 22 projects beyond the end attachment 49 in the manner depicted in FIG. 6.

To employ the tool 10 with the end attachment 49, the plunger provided by the broadened foot of the handle 22 is located atop a weed to be removed. The sleeve 12 is then raised about 12 to 24 inches above the surface of the soil 44, as depicted in FIG. 6, and then is thrust downwardly hard against the soil. The tubing section 54 of the end attachment 49 will thereupon drive into the soil to define a plug 46' therewithin, as depicted in FIG. 7.

The washer 60 serves to guide the sleeve 12 so that the lower edge of the tube section 54 does not strike the broadened foot of the handle 22. However, even if there is some slight misalignment, the frusto-conical surface 58 will deflect the lower edge of the tube section 54 back onto its proper course. The tube section 54 can thereby be driven into the soil 44 coaxially about the cylindrical portion 52 of the broadened foot of the handle 22.

When the tube section 54 of the end attachment 49 is driven into the soil as depicted in FIG. 7, it defines a plug which surrounds the tap root of a garden or lawn weed. When the sleeve 12 is lifted vertically upward out of the soil 44, it carries with it the plug 46' in the hollow chamber 18' defined within the tube section 54. The tube section 54 is then placed over a disposal receptacle and the handle 22 is forced into the sleeve 12. The plunger, formed by the broadened foot of the handle 22, thereupon forces the plug 46' out of the mouth of the tube section 54. The tool 10 is thereupon again ready for reuse.

Undoubtedly, numerous other variations and modifications of the invention will become readily apparent to those familiar with gardening tools. For example, the tool of the invention may be equipped with end attachments of various configuration depending upon the nature and growth patterns of weeds to be removed. Also, it is to be understood that the tool of the invention may be used to plant plugs of desirable vegetation, such as grass, to start a lawn.

When employed as a garden transplanting tool, the end of the tool 10 is pushed into barren soil into which plugs of desirable grass are to be planted. A plug of barren soil is then removed in the manner previously described. The tool is then taken to a supply of sod of desirable grass and a plug of that grass is lodged in the turf receiving chamber 18 or 18' in the manner previously described. The tool is then taken to the location from which the barren plug of soil was removed, and the lower extremity of the tool is inserted into the cavity left behind by removal of the barren plug. The sleeve 12 is then lifted while the plunger of the invention is pressed downward toward the earth. The sleeve 12 raises the walls of the hollow enclosure and the plunger prevents the plug of desirable soil from coming up with the hollow chamber. The process is repeated until plugs of desirable vegetation have been located at spaced intervals about an area theretofore barren of desirable growth. The plugs are then watered and tend to grow by expanding outwardly from the locations at which they are transplanted.

The scope of the invention should not be construed as limited to the specific embodiments and implementations depicted herein, but rather is defined in the Claims appended hereto.

I claim:

1. A gardening tool comprising:
an elongated, upright tubular sleeve, an elongated handle disposed for longitudinal movement within said sleeve wherein the lower extremity of said handle terminates in a broadened foot of greater cross sectional area than said handle and smaller cross section than the internal cross section of said sleeve, and wherein the upper surface of said foot is of frusto-conical configuration, a first end attachment adapted for removable securement to said sleeve at the lower extremity thereof, said first end attachment having a transverse roof with a central axial aperture therein and longitudinal encompassing walls depending from said roof to define an interior cavity having a uniform cross sectional area perpendicular to the alignment of said sleeve, a plunger including a transverse piston disposed within said cavity to extend across said uniform cross sectional area, an axial stem extending upwardly from said piston and through said central axial aperture in said roof, and a flat cap at the top of said stem larger than said axial aperture in said roof and located externally of said cavity and within the confines of said sleeve, whereby when said first end attachment is secured to said sleeve said piston is constrained to move longitudinally within said cavity and said foot is operable to bear upon said cap of said plunger to push said piston through said cavity, and a second end attachment adapted for removable securement to said sleeve in place of said first end attachment and comprising an extension of said sleeve having the same cross sectional dimensions as said sleeve whereby when said second end attachment is secured to said sleeve said sleeve is longitudinally reciprocal relative to and beyond said foot and said frusto-conical surface guides said sleeve to move coaxially relative to said handle.

2. A gardening tool according to claim 1 in which said encompassing walls are formed of a section of annular steel tubing and said roof is formed of a flat steel plate secured across the top of said section of steel tubing, and said sleeve is formed of an elongated length of steel pipe of narrower diameter than said tubing.

3. A gardening tool comprising an elongated, upright tubular sleeve, a handle reciprocally mounted within said sleeve and terminating at one end in a broadened foot of greater cross sectional area than said handle and smaller cross section than said sleeve, wherein the upper surface of said broadened foot is of frusto-conical configuration, a first end attachment adapted for removable securement to said sleeve and comprising upright walls which define a turf receiving chamber open at the bottom and a roof with an aperture therethrough and a plunger disposed for longitudinal reciprocal movement relative to said chamber and having a piston extending across said chamber, an axial stem joined to said piston and extending through said aperture in said roof, and a flat, bearing cap larger than said aperture in said roof joined to the top of said stem, whereby said handle is operable to press said foot against said bearing cap when said first end attachment is secured to said sleeve, and a second end attachment adapted for alternative removable securement to said sleeve in place of said first end attachment and comprising a tubular extension of said sleeve having the same cross sectional dimensions as said sleeve, whereby said sleeve is longitudinally reciprocal relative to and beyond said foot and said frusto-conical surface guides said sleeve to move axially relative to said handle when said second end attachment is secured to said sleeve.

4. A gardening tool according to claim 3 in which said roof is formed of a flat plate perpendicular to said sleeve and extending beyond said upright walls to define overhanging flanges.

5. A gardening tool according to claim 3 in which said upright walls are formed of a section of cylindrical annular tubing and said piston is a circular plate disposed within said chamber.

6. A gardening tool according to claim 3 in which an annular socket is permanently secured to the top of said chamber roof about said aperture therethrough, and said sleeve fits into said socket and is releasably secured thereto.

7. A gardening tool comprising an elongated rod serving as a handle and terminating at its lower extremity in a broadened foot of cross section greater than the cross section of said rod, wherein the upper surface of said broadened foot is of frusto-conical configuration, a tubular sleeve of greater cross section than said foot disposed about said rod for longitudinal reciprocal movement relative thereto, an annular guide disposed between said sleeve and said handle, a first end attachment adapted for removable securement to said lower extremity of said sleeve and having a transverse roof with a central, axial aperture therein and longitudinal encompassing walls depending from said roof defining an interior chamber having a uniform cross sectional area perpendicular to the alignment of said sleeve, a plunger including a transverse piston disposed within said chamber to extend across said uniform cross sectional area, an axial stem extending upwardly from said piston and through said central axial aperture in said roof, and a flat cap at the top of said stem larger than said axial aperture in said roof and located externally of said chamber and within the confines of said sleeve when said first end attachment is secured to said sleeve, and an alternative end attachment adapted for removable securement to said lower extremity of said sleeve and comprising a tubular extension of said sleeve having the same cross sectional dimensions as said sleeve.

* * * * *